United States Patent [19]
Veen

[11] Patent Number: 5,620,714
[45] Date of Patent: Apr. 15, 1997

[54] DISTRIBUTOR HEAD FOR FORMING A TUBULAR PROFILE FROM ONE OR MORE STREAMS OF EXTRUDED THERMOPLASTIC MATERIAL

[75] Inventor: Hendrik W. Veen, Ommen, Netherlands

[73] Assignee: Machinefabriek "de Rollepaal" B.V., Dedemsvaart, Netherlands

[21] Appl. No.: 381,921

[22] PCT Filed: Jul. 30, 1993

[86] PCT No.: PCT/NL93/00165

§ 371 Date: Feb. 13, 1995

§ 102(e) Date: Feb. 13, 1995

[87] PCT Pub. No.: WO94/04341

PCT Pub. Date: Mar. 3, 1994

[30] Foreign Application Priority Data

Aug. 14, 1992 [NL] Netherlands ............................ 9201457

[51] Int. Cl.⁶ ............................ B29C 47/06; B29C 47/70
[52] U.S. Cl. .................... 425/133.1; 425/192 R; 425/462
[58] Field of Search ............................ 425/131.1, 133.1, 425/462, 192 R

[56] References Cited

U.S. PATENT DOCUMENTS

| | | |
|---|---|---|
| D. 324,739 | 3/1992 | Macaluso . |
| 3,914,366 | 10/1975 | Wilson . |
| 3,981,672 | 9/1976 | Wilson . |
| 4,061,462 | 12/1977 | Giannarelli et al. . |
| 4,120,633 | 10/1978 | Feuerherm ............................ 425/133.1 |
| 4,336,012 | 6/1982 | Koch et al. ............................ 425/131.1 |
| 4,405,547 | 9/1983 | Koch et al. . |
| 4,492,549 | 1/1985 | Rasmussen et al. ..................... 425/462 |
| 4,758,144 | 7/1988 | Becker ................................. 425/133.1 |
| 5,078,942 | 1/1992 | Sullivan et al. . |
| 5,094,793 | 3/1992 | Schrenk et al. . |
| 5,141,698 | 8/1992 | Daubenbuchel et al. ............ 425/133.1 |
| 5,256,049 | 10/1993 | Langos et al. . |
| 5,256,051 | 10/1993 | Langos et al. . |

FOREIGN PATENT DOCUMENTS

| | | |
|---|---|---|
| 0050476A3 | 4/1982 | European Pat. Off. . |
| 0492894A1 | 7/1992 | European Pat. Off. . |
| 1308573 | 5/1961 | France . |
| 1927405 | 4/1964 | Germany . |
| 2847627A1 | 7/1979 | Germany . |
| WO90/11880 | 10/1990 | Germany . |
| WO91/18731 | 12/1991 | Germany . |
| 7213049 | 3/1973 | Netherlands . |
| 7507062 | 12/1975 | Netherlands . |
| 1410777 | 10/1976 | United Kingdom . |
| 1508851 | 4/1978 | United Kingdom . |
| 2109740 | 6/1983 | United Kingdom ................ 425/133.1 |

*Primary Examiner*—Khanh P. Nguyen
*Attorney, Agent, or Firm*—Wigman, Cohen, Leitner & Myers, P. C.

[57] ABSTRACT

A distributor head (1) for forming a tubular profile from one or more streams of thermoplastic material, which distributor head comprises at least an inlet orifice (10, 12, 14) for a stream of plastics material, which can be connected to an extruder, and an outlet orifice (20, 22, 24) of annular cross section. The distributor head comprises at least one flow channel system (30, 32, 34) which is connected to an inlet orifice of the distributor head by means of an inlet channel (36, 38, 40), which inlet channel, in a number of stages of branchings and intermediate flow channels (60, 62, 64), branches into a number of outlet channels (66, 68, 70) terminating on a periphery around the center line of the outlet orifice, which outlet channels open into the outlet orifice.

5 Claims, 5 Drawing Sheets

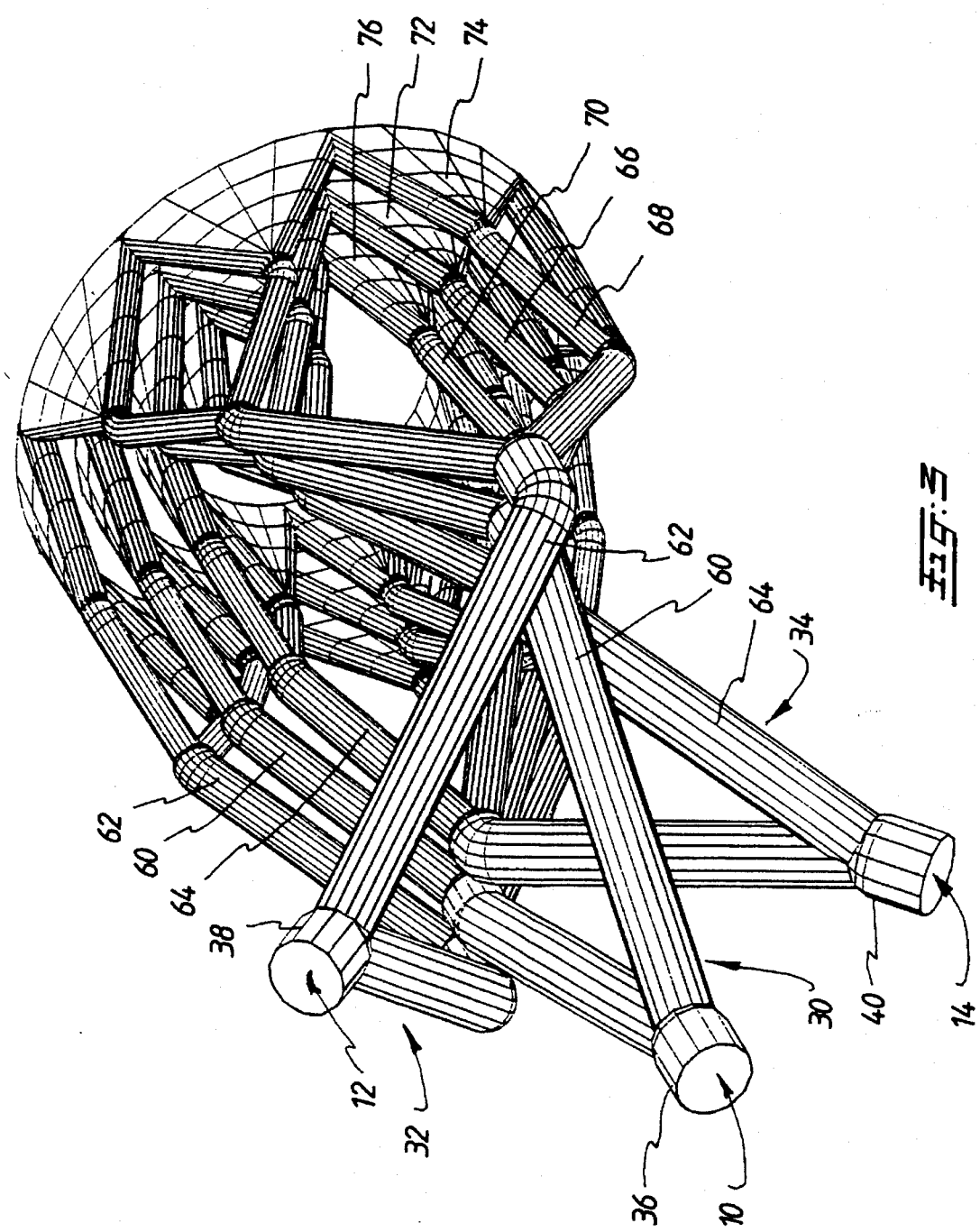

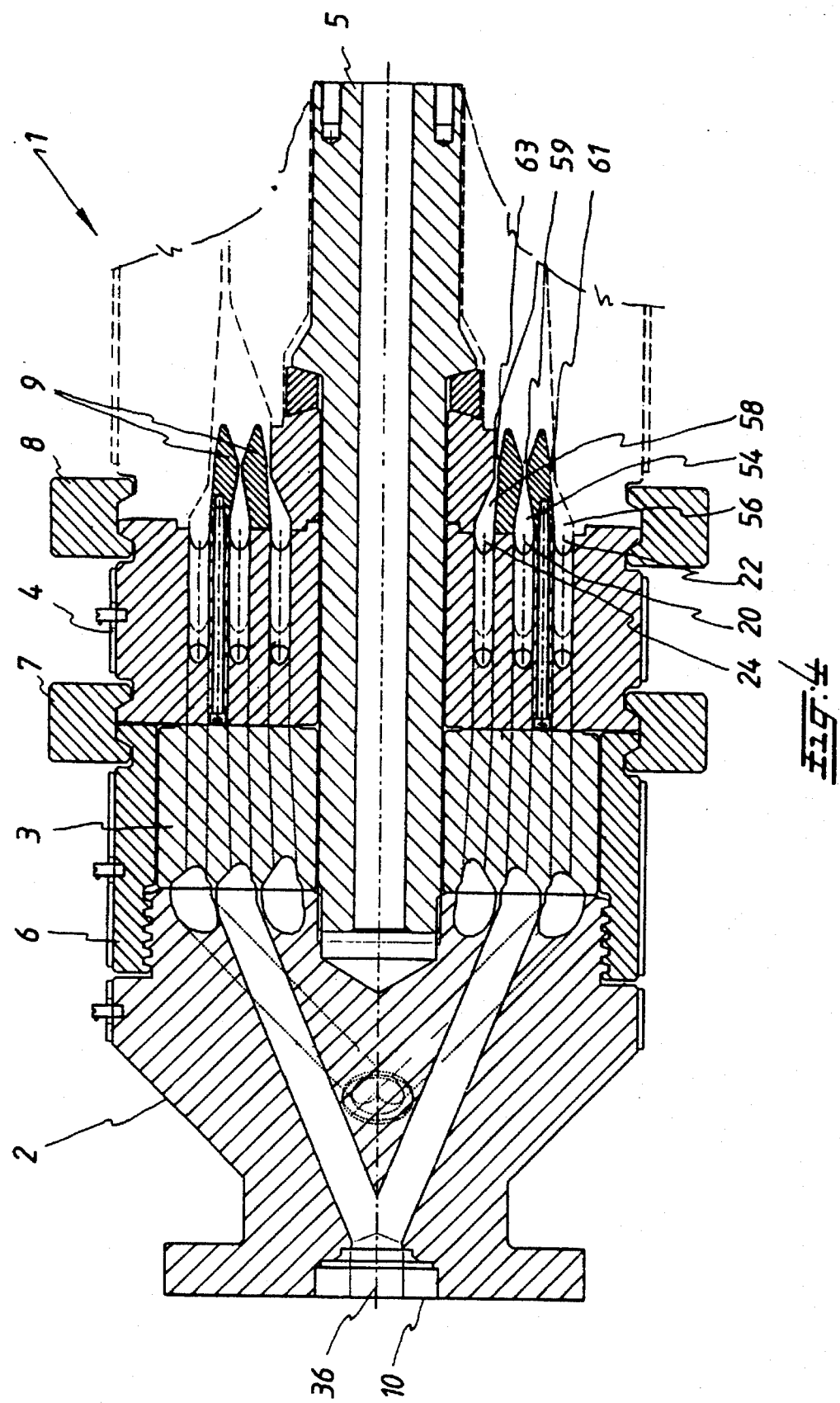

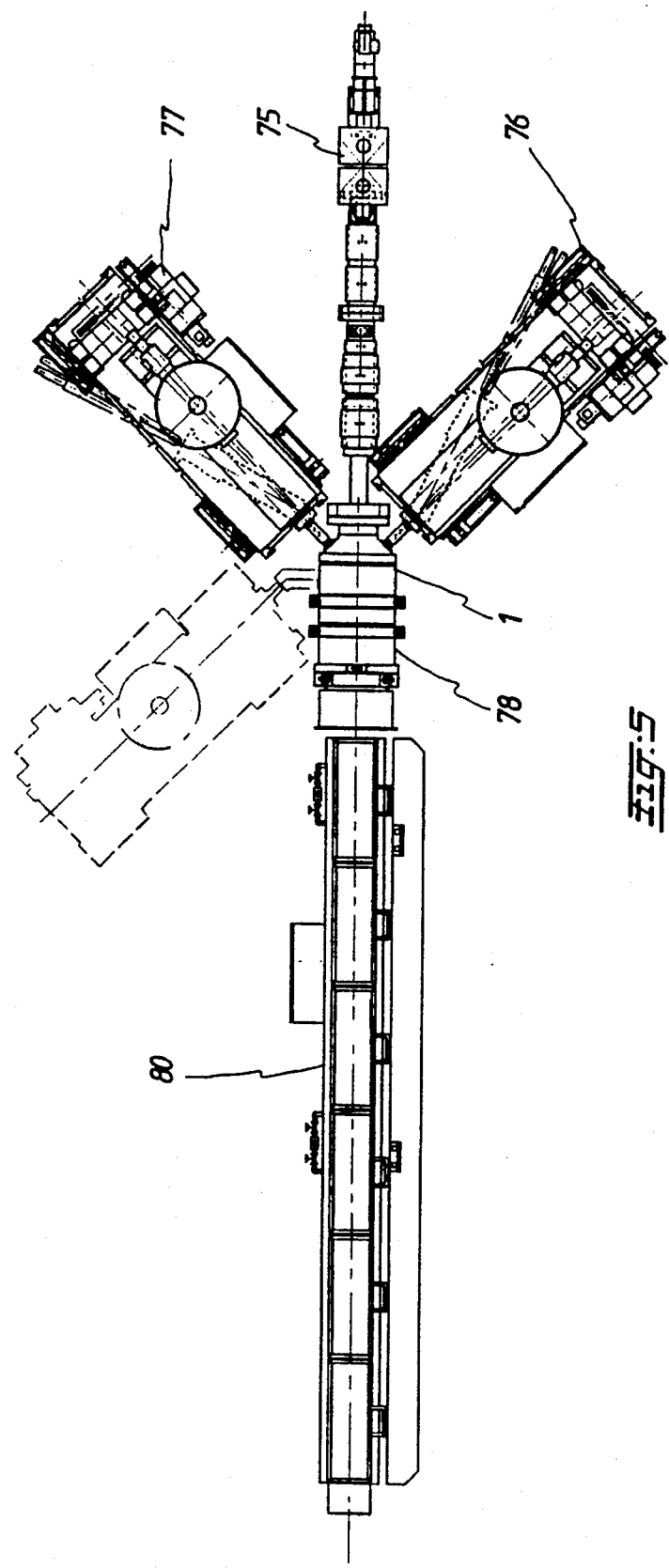

DISTRIBUTOR HEAD FOR FORMING A TUBULAR PROFILE FROM ONE OR MORE STREAMS OF EXTRUDED THERMOPLASTIC MATERIAL

BACKGROUND OF THE INVENTION

The invention relates to a distributor head for forming a tubular profile from one or more streams of extruded thermoplastic material, which distributor head comprises at least an inlet orifice for a stream of plastics material, which can be connected to an extruder, and an outlet orifice of annular cross section.

In many cases, extruders which are connected at their output side to a distributor head are used to produce tubular profiles from thermoplastic materials. In the case of profiles having a wall consisting of a single layer, said distributor head is generally positioned in line with the extruder, so that the material stream from the extruder passes through in a virtually rectilinear manner. For certain applications and materials, distributor heads are also known in which the direction of the material stream is altered. Said distributor heads are generally referred to as "crossheads". In comparison with the aforementioned distributor heads which are positioned in line with an extruder and which are also known as "straight heads", crossheads of this type have the advantage, inter alia, that the interior of the extruded tube can be accessed easily, for example in order to fit a cooled core. When manufacturing profiles having a wall consisting of a plurality of layers, for example three layers, it is also known to position at least one of the inlet orifices at an angle to the centre line of the outlet orifice. In "straight" distributor heads, where a material stream is fed along the centre line of the outlet orifice and which have an inner core attached to the distributor head, the essentially annular stream of plastics material around the core is interrupted in at least one location by an element which connects the core to the housing of the distributor head. In the case of a distributor head in which at least one inlet orifice is positioned at an angle to the centre line of the associated outlet orifice, the material stream fed in through this inlet orifice is separated in an annular chamber into a number of branch streams and downstream thereof, said branch streams are combined to form a closed ring at the outlet orifice. In both cases, the material introduced into the distributor head at the respective inlet orifice flows to the associated outlet orifice along different paths. The disadvantage in this case is that these flow paths have a mutually different flow resistance. In addition, the fact that the length of the different flow paths may differ appreciably is disadvantageous. As a result, the residence time of the plastics material inside the distributor head varies and is difficult to determine, which has an adverse effect on the process control and process adjustment. These disadvantages occur to a considerable degree particularly if the material stream in the distributor head has to change direction.

A sensitive material such as, for example, normal rigid polyvinylchloride (PVC) can be processed using a "crosshead" only if particular attention is paid to the additives which are mixed in with the PVC in order to ensure the necessary stability. However, these additives are expensive, adversely affect the properties of the material alter extrusion and in many cases pollute the environment.

SUMMARY OF THE INVENTION

The object of the invention is therefore to overcome the abovementioned disadvantages. In order to achieve this object, the invention provides a distributor head of the kind mentioned in the preamble, which is characterized in that the distributor head comprises at least one flow channel system which is connected to an inlet orifice of the distributor head by means of an inlet channel, which inlet channel, in a number of stages of branchings and intermediate flow channels, branches into a number of outlet channels terminating on a periphery around the centre line of the outlet orifice, which outlet channels open into the outlet orifice.

In a preferred embodiment, a flow channel branches into two further flow channels at each branching. In this manner, the material stream fed in at the inlet orifice can be evenly distributed and be passed to an annular outlet orifice.

In this arrangement, the outlet channels preferably terminate at essentially the same mutual distance.

In a further embodiment, a fan-shaped mouth facing the outlet orifice is connected to each outlet channel. In this case, it is advantageous for the fan-shaped mouths to adjoin to one another laterally at their outflow ends. In this manner, a uniform and annular outflow is achieved.

Advantageously, the cross-sectional areas of the flow channels downstream of a branching are equal and together are essentially equal to the cross-sectional area of the flow channel upstream of the branching. The fact that the total cross-sectional area remains equal ensures that the rate of flow of the material does not drop below a predetermined lower limit.

Furthermore, it is advantageous for all the paths through the flow channels associated with one flow channel system to have essentially the same length between the inlet orifice and the outlet orifice, and for the variation in the cross section of the flow channels of all paths to be essentially identical. It is thus ensured as far as possible that the plastics material flowing through a flow channel system encounters essentially the same resistance along each flow path and has an identical residence time.

In an advantageous embodiment, an annular channel is connected to an outlet orifice, the cross-sectional area of which channel decreases in a first zone between the outlet orifice and a throat section and in a second zone downstream of the throat section increases in such a manner that the flow rate of a material stream in the first or second zone increases or decreases, respectively, by a maximum factor of 5 per second. A higher deformation per unit time of the plastics material stream would give rise to fracturing of the material.

Preferably, at each branching, the smallest angle which is formed by the flow channel upstream of the branching and a flow channel downstream of said branching is more than 90 degrees. In particular, when sensitive plastics materials are processed, it is thus ensured that the material does not flow at too acute an angle and that the flow rate does not differ locally to too large an extent with the result that the material tends to decompose.

In an advantageous embodiment, the distributor head comprises a number of bodies, each body being provided with all the flow channels associated with one branching stage. In this case, the bodies are preferably disc-shaped. This ensures that the flow channels can be provided in each disc in a simple manner and thus enables a flow channel system of inherently complicated design to be produced. In this arrangement, it is also possible to use certain discs in more than one flow channel system and for different tube profiles. The flow channels can likewise be cleaned in a simple manner.

In a variant of the embodiment, the bodies are fixed in the distributor head by means of clamping rings engaging on the outer periphery thereof and a core extending through an axial bore in the bodies. Assembly and disassembly can thus take place in a simple manner.

So as to ensure a uniform flow through the flow channels, the flow channels preferably have an essentially circular cross section. In this manner, the occurrence of "hot spots", i.e. sites having an excessively high temperature, is prevented.

If a tube profile having a multi-layered wall has to be produced, the distributor head has a plurality of concentric outlet orifices and a number of inlet orifices. In this case, it is possible, for example, for one inlet orifice to be connected to two flow channel systems in order to form the inner and the outer layer of a tube profile whose wall consists of three layers. In addition, one extruder may, for example, be connected to two inlet orifices by means of a manifold.

BRIEF DESCRIPTION OF THE DRAWINGS

The invention will be explained below in more detail by reference to the drawing of an exemplary embodiment of a distributor head according to the invention, wherein:

FIG. 3 shows an illustration of the form of the flow channel systems of the distributor head of FIG. 1, FIG. 4 shows a longitudinal section through the distributor head of FIG. 1, and FIG. 5 shows a production set-up comprising three extruders and the distributor head of FIG. 1.

DETAILED DESCRIPTION OF THE PREFERRED EMBODIMENTS

Figure 1:
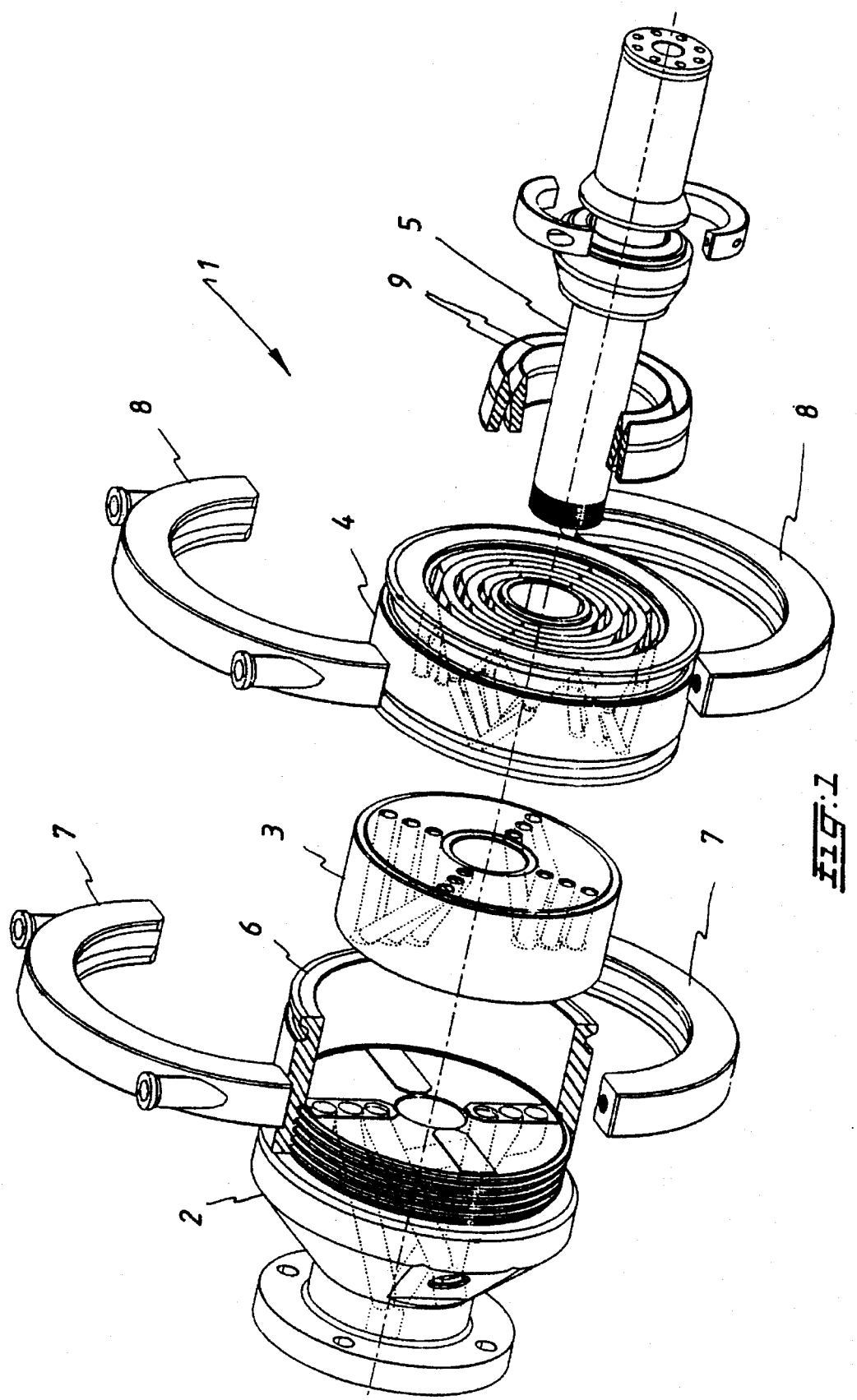
FIG. 1 shows an exploded view of a distributor head according to the invention for forming a tube from thermoplastic material, which tube has a wall consisting of three layers.

FIG. 1 shows a distributor head which is referred to in its entirety by reference numeral 1. Three extruders can be connected to base part 2 for forming a tube profile having a three-layered wall. The distributor head comprises two disc-shaped bodies 3, 4. By means of core 5, the disc-shaped bodies can be fastened in the middle to the base part 2. A ring 6 is screwed onto the outer periphery of base part 2, which ring is provided with a circular groove on its outside. By fitting a clamping ring 7 consisting of two halves in said groove and in a groove of the disc-shaped body 4, the disc-shaped bodies 3, 4 are fastened to the base part 2. A die body (not shown) may be attached to the distributor head by means of clamping ring 8. The rings 9, a portion of which has been partly omitted, are attached to the disc-shaped body 4 by means of screws.

Figure 2:
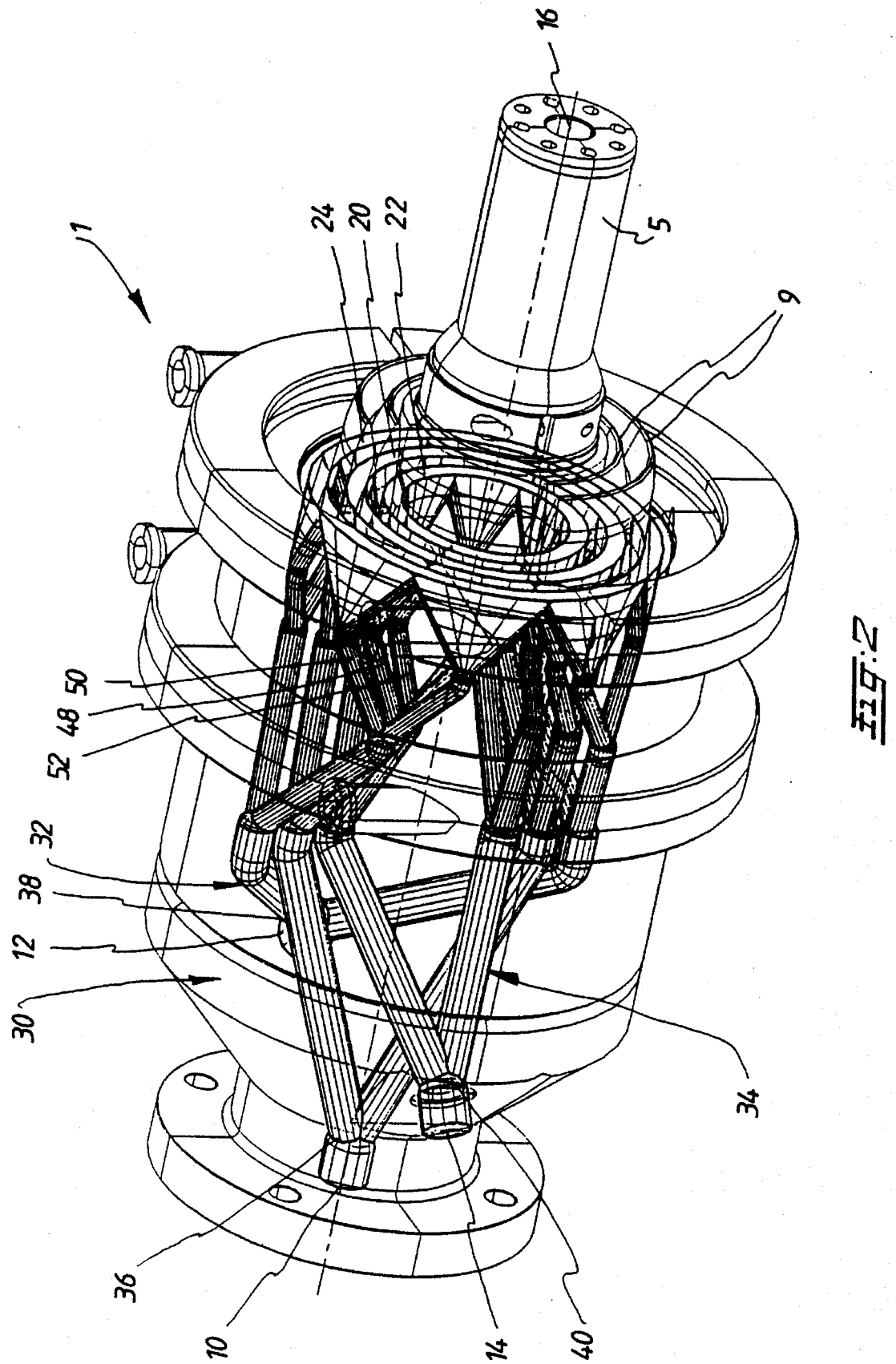
FIG. 2 shows an illustration of the distributor head of FIG. 1 in the form of a wire model.

FIG. 2 shows a wire model of the distributor head 1 from FIG. 1, showing, in particular, the construction and the position of the flow channel systems. Three extruders may be connected to said distributor head at inlet orifices 10, 12, 14. The centre line of the extruder for forming the intermediate layer of the wall of the tube profile to be formed coincides with the centre line 16 of the distributor head. The centre lines of the extruders for forming the inner and outer layer, respectively, are at an angle relative to the centre line of the distributor head. The distributor head comprises three flow channel systems, 30, 32 and 34 for forming the intermediate, outer and inner layer of the wall, respectively. Each flow channel system, 30, 32, 34 has a short inlet channel 36, 38, 40 which is connected to an inlet orifice 10, 12, 14. In addition, each flow channel system has a number of outlet channels 48, 50, 52 which, by means of fan-shaped mouths, open into an outlet orifice 20, 22, 24 of annular cross section and whose centre line coincides with the centre line 16 of the distributor head.

The construction of the flow channel systems of the distributor head 1 is shown more clearly in the illustration of FIG. 3. In each flow channel system 30, 32, 34, the associated inlet channel 36, 38, 40, in a number of stages and via intermediate flow channels 60, 62, 64, branches into a number of outlet channels 66, 68, 70 terminating at essentially the same mutual distance and located in a circle around the centre line of the distributor head. Said outlet channels terminate in fan-shaped mouths 72, 74, 76 which adjoin one another at their outflow ends.

In the exemplary embodiment shown, the branching of each inlet channel 36, 38, 40 is effected in three stages, so that each flow channel system eventually has eight outlet channels. A material stream entering via an inlet orifice is thus separated in a flow channel system into eight branch streams, which are evenly distributed over the circumference of a circle. At the end of the fan-shaped mouths, said branch streams are combined to form one material stream of annular cross section.

The construction of the distributor head having disc-shaped bodies 3, 4, which are each provided with all the flow channels associated with one branching stage, permits simple manufacture of the complicated flow channel systems. The cylindrical flow channels can be drilled in each case through a disc-shaped body (as well as through the base part 2) and the desired form at the branchings and bends can be obtained by means of a milling operation. The fan-shaped mouths are likewise simple to produce. The annular lateral faces of the disc-shaped bodies and the base part are designed such that they can be pressed onto one another around the flow channels by clamping so as to provide an effective mutual seal.

The three concentric material streams emanating from the distributor head 1 and having an annular cross section are combined with one another in a die body which is not part of the invention, to form a tube profile having a three-layered wall.

In order to obtain a high-quality product, it is desirable for all of the plastics material which enters one flow channel system at a given point in time to leave said flow channel system again at the same time. Differences in rates of flow of the different branch streams within one flow channel system therefore have to be limited.

For this purpose, the length of all of the paths through the flow channels, in one flow channel system, extending between the inlet orifice and the outlet orifice is essentially identical just as the variation in the cross section of the flow channels corresponding to said paths is identical.

Owing to the nature of the molten plastics material, a laminar flow is produced in the cylindrical flow channels. The bends present in each flow channel system have a spherical or flattened spherical profile which is also the case for the locations where the flow channels branch.

Because the cylindrical flow channels are formed in solid discs which are usually made of steel, the heat which develops as a result of the friction of the material flowing through the flow channels is evenly dissipated to the outside. In addition, there are no abrupt transitions as would be the case if the flow channels had a rectangular cross section. The occurrence of so-called "hot spots" is thus prevented.

With the distributor head according to the invention, it has been shown to be possible, when processing a plastics material which is susceptible to decomposition, such as PVC, to change the direction of a material stream emanating from an extruder and reform it into a material stream of annular cross section without the addition of substances promoting the stability of the material and without the material decomposing.

By using the distributor head described above, tubes having a multi-layered wall and excellent properties can be obtained.

The fan-shaped mouths of the respective flow channel systems can be positioned in such a manner with respect to one another that the "weld lines" are not in the same location on the periphery of the tube. A possibly adverse effect of weld lines is thus reduced even further.

The longitudinal section of FIG. 4 shows the distributor head 1. The disc-shaped body 4 is provided both with the outlet channels and the fan-shaped mouths. In another embodiment, the disc-shaped body 4 consists of two separate disc-shaped bodies, one being provided with the outlet channels and the other one being provided with the fan-shaped mouths. Said disc-shaped bodies can be fastened to each other by means of a clamping ring. The dotted line marks the outline of a part of a die body connected to the distributor head. The rings 9 and the core 5 form annular channels 54, 56, 58 connected to the outlet orifices 20, 22, 24 and each having a throat section 59, 61, 63, respectively.

FIG. 5 shows an example of an application of the distributor head 1. Extruder 75 supplies the plastics material for forming the intermediate layer, while extruders 76 and 77 form the inner and the outer wall, respectively. After it has left the distributor head and the die body 78, the tubular profile is cooled in a cooling device 80.

In the abovementioned exemplary embodiment, a distributor head for forming a round tube having a three-layered wall has been described. However, the invention also applies to a distributor head for forming a tubular profile having a cross section which is not tubular.

In a somewhat different embodiment, the distributor head may comprise two or only one flow channel system instead of three. In these cases a tubular profile having a two-layered or one-layered wall, respectively, is formed by means of the distributor head. The advantages sought by means of the invention are likewise achieved in these cases.

I claim:

1. Distributor head for forming a tubular profile from one or more streams of thermoplastic material, comprising at least one flow channel system for a stream of thermoplastic material, extending between an inlet orifice, and an outlet orifice having an annular cross-section, said flow channel system comprising an inlet flow channel connected to the inlet orifice, which inlet allow channel branches into intermediate flow channels in a number of branching stages with associated branchings, said branching stages succeed one another in the outlet direction of said thermoplastic material stream along the center line of the outlet orifice, the last intermediate flow channels branching into outlet flow channels terminating on a periphery around the center line of the outlet orifice, each outlet flow channel connecting to a fan-shaped mouth which opens into the outlet orifice, wherein each flow channel of the flow channel system has an essentially circular cross section and extends essentially rectilinearly; a plurality of successive axial bodies, each axial body provided with all flow channels corresponding to a single branching stage of said flow channel system, said axial bodies being fixed in the distributor head by clamping rings engaging on the outer periphery thereof and a core extending through an axial bore in the axial bodies.

2. Distributor head for forming a tubular profile from one or more streams of thermoplastic material, comprising at least one flow channel system for a stream of thermoplastic material, extending between an inlet orifice, and an outlet orifice having an annular cross-section, said flow channel system comprising an inlet flow channel connected to the inlet orifice, which inlet flow channel branches into intermediate flow channels in a number of branching stages with associated branchings, said branching stages succeed one another in the outlet direction of said thermoplastic material stream along the center line of the outlet orifice, the last intermediate flow channels branching into outlet flow channels terminating on a periphery around the center line of the outlet orifice, each outlet flow channel connecting to a fan-shaped mouth which opens into the outlet orifice, wherein each flow channel of the flow channel system has an essentially circular cross-section and extends essentially rectilinearly;

wherein the cross-sectional area of the flow channels downstream of a branching are equal and are in combination essentially equal to the cross-sectional area of the flow channel upstream of the branching;

wherein the distributor head comprises a plurality of successive axial bodies each being provided with all the flow channels corresponding to a single branching state of the flow channel system; and wherein the axial bodies are fixed in the distributor head by clamping rings engaging on the outer periphery thereof and a core extending through an axial bore in the axial bodies.

3. Distributor head for forming a tubular profile from one or more streams of thermoplastic material, comprising at least one flow channel system for a stream of thermoplastic material, extending between an inlet orifice, and an outlet orifice having an annular cross-section, said flow channel system comprising an inlet flow channel connected to the inlet orifice, which inlet flow channel branches into intermediate flow channels in a number of branching stages with associated branchings, said branching stages succeed one another in the outlet direction of said thermoplastic material stream along the center line of the outlet orifice, the last intermediate flow channels branching into outlet flow channels terminating on a periphery around the center line of the outlet orifice, each outlet flow channel connecting to a fan-shaped mouth which opens into the outlet orifice, wherein each flow channel of the flow channel system has an essentially circular cross-section and extends essentially rectilinearly;

wherein the distributor head comprises a plurality of successive axial bodies each being provided with all the flow channels corresponding to a single branching state of the flow channel system;

wherein the axial bodies are essentially disc-shaped;

wherein the axial bodies are fixed in the distributor head by clamping rings engaging on the outer periphery thereof and a core extending through an axial bore in the axial bodies.

4. Distributor head according to claim 2, wherein the distributor head has a plurality of concentric outlet orifices and a number of inlet orifices.

5. Distributor head according to claim 3, wherein the distributor head has a plurality of concentric outlet orifices and a number of inlet orifices.

* * * * *